(12) United States Patent
Waters

(10) Patent No.: US 9,851,204 B2
(45) Date of Patent: *Dec. 26, 2017

(54) MAGNETORMETER CALIBRATION FOR NAVIGATION ASSISTANCE

(71) Applicant: Texas Instruments Incorporated, Dallas, TX (US)

(72) Inventor: Deric Wayne Waters, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 1315 days.

This patent is subject to a terminal disclaimer.

(21) Appl. No.: 13/738,499

(22) Filed: Jan. 10, 2013

(65) Prior Publication Data

US 2013/0124129 A1 May 16, 2013

Related U.S. Application Data

(63) Continuation-in-part of application No. 13/571,501, filed on Aug. 10, 2012, now Pat. No. 9,303,986.

(60) Provisional application No. 61/522,112, filed on Aug. 10, 2011.

(51) Int. Cl.
*G01C 17/38* (2006.01)
*G06F 17/00* (2006.01)
*G06F 15/00* (2006.01)

(52) U.S. Cl.
CPC ............. *G01C 17/38* (2013.01); *G06F 15/00* (2013.01); *G06F 17/00* (2013.01)

(58) Field of Classification Search
None
See application file for complete search history.

(56) References Cited

U.S. PATENT DOCUMENTS

2006/0103927 A1\* 5/2006 Samukawa .......... G06K 9/3241
359/436
2009/0222204 A1\* 9/2009 Roberts ................ G05D 1/0259
701/470

\* cited by examiner

*Primary Examiner* — Tung Lau
(74) *Attorney, Agent, or Firm* — Ronald O. Neerings; Charles A. Brill; Frank D. Cimino

(57) ABSTRACT

Visual codes are scanned to assist navigation. The visual code may be a Quick Response (QR) code that contains information useful to calibrating a variety of navigation-based sensors such as gyroscopes, e-compasses, and barometric pressure sensors. Embodiments describe methods for magnetometer calibration and computing sensor orientation relative to users' local frame of reference. The embodiments use an initial yaw estimate, accelerometer, and gyroscope measurements along with other readily available information (the earth's magnetic field intensity, inclination angle, and declination angle).

38 Claims, 3 Drawing Sheets

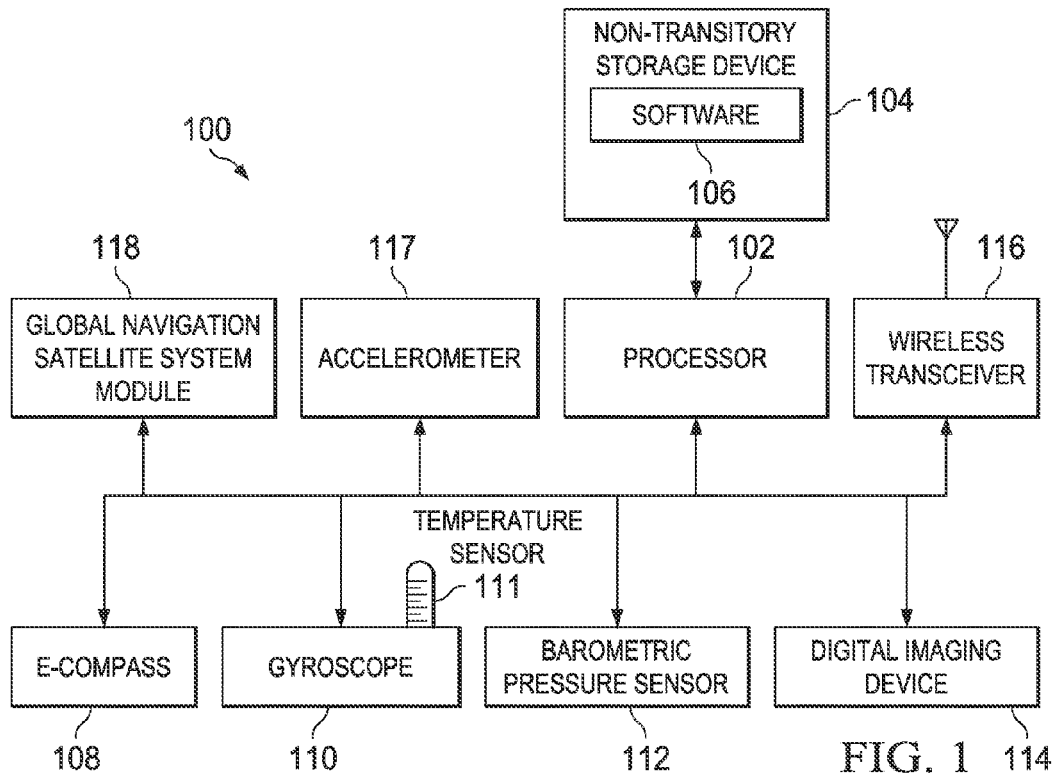
FIG. 1
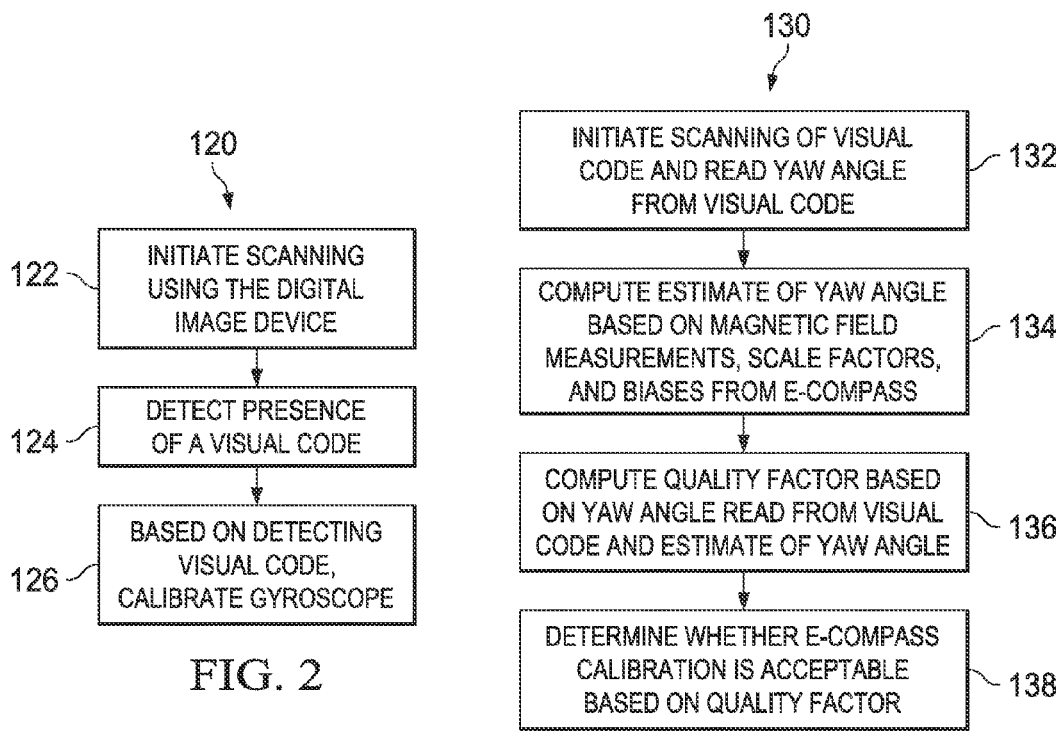
FIG. 2
FIG. 3

MAGNETORMETER CALIBRATION FOR NAVIGATION ASSISTANCE

CROSS-REFERENCE TO RELATED APPLICATION

This Application is a Continuation-in-Part and claims priority to U.S. patent application Ser. No. 13/571,501 filed Aug. 10, 2012, which claims priority to U.S. Provisional Patent Application No. 61/522,112 filed on Aug. 10, 2011 which is hereby incorporated herein by reference.

BACKGROUND

Many applications for smartphones use location information. Many smartphones include a global navigation satellite system (GNSS) such as the global positioning system (GPS). In an indoor environment, GNSS solutions do not always function accurately due to heavy attenuation of the satellite signals. Alternatives are available to GNSS such as sensor-based navigation and WiFi-based positioning.

Sensor-based solutions may include a micro-electrical-mechanical system (MEMS) sensor such as an accelerometer, an electronic compass (e-compass), gyroscope, etc. An issue in sensor-based solutions is sensor calibration. Sensors provide only user-displacement information, not absolute location. Thus, an initial position is required. The sensor can be used to determine position from that point forward as the smartphone becomes mobile. Measurement errors, however, eventually render the position determined from a sensor inaccurate.

Magnetometers are commonly included in consumer electronic devices to enable navigation or other applications. The magnetometer's measurements are only useful when they are calibrated. Typically, when the user wants to use an application that requires the magnetometer, the device instructs the user to perform a calibration maneuver. This can be confusing and tedious, which devalues the use of the magnetometer.

The prior art developed an error model for the magnetometer and describes a least-squares estimator for the calibration parameters. The least-squares estimator requires a reasonably accurate initial guess that is obtained via an algorithm. Another valuable contribution from the prior art is that a covariance of the estimate is provided. A more generalized parameter estimator in a concise form has been developed as was a similar magnetometer error model and an even more generalized calibration parameter estimator.

SUMMARY

In some embodiments, a system includes an imaging device, a barometric pressure sensor, and a processor coupled to the imaging device and the pressure sensor. The processor causes the imaging device to scan a visual code. Based on scanning the visual code, the processor obtains a first value indicative of height of the visual code from the visual code and obtains a first barometric pressure reading from the pressure sensor. After scanning the visual code, the processor uses the first value indicative of height of the visual code and the first barometric pressure reading to determine a height of the system.

A corresponding method includes initiating scanning of a visual code and obtaining a first value indicative of height of the visual code from the visual code. The method further includes obtaining a first barometric pressure reading from a barometric pressure sensor. From a second height, a second barometric pressure reading is obtained from the barometric pressure sensor. The method includes computing a second value indicative of height based on the second barometric pressure reading, the first value indicative of the height of the visual code, and a rate of change of pressure with respect to height.

In other embodiments, a system includes an imaging device, an e-compass, an accelerometer, and a processor coupled to the imaging device, the e-compass, and the accelerometer. The processor causes the imaging device to scan a visual code, read a yaw angle from the QR code, and compute an estimate of a yaw angle based on magnetic field measurements taken by the e-compass and scale factors and biases determined by the e-compass. Based on scanning the visual code, the processor computes a quality factor based on the yaw angle read from the visual code and the estimate of the yaw angle. The processor determines whether the e-compass is satisfactorily calibrated based on the quality factor.

A corresponding method of calibrating an e-compass includes scanning a visual code, reading yaw angle from visual code, and computing an estimate of yaw angle based on magnetic field measurements, scale factors, and biases from the e-compass. The method further includes computing a quality factor based on the yaw angle read from the visual code the estimate of the yaw angle and determining whether calibration of the e-compass is acceptable based on the quality factor.

Other embodiments are directed to a system including an imaging device, a gyroscope, and a processor coupled to the imaging device and the gyroscope. The processor causes the imaging device to scan a visual code and, based on scanning the visual code, the processor causes the gyroscope to be calibrated.

A corresponding method includes initiating scanning using a digital image device, detecting the presence of a visual code, and based on detecting the visual code, calibrating a gyroscope.

BRIEF DESCRIPTION OF THE DRAWINGS

FIG. 1 shows a system in accordance with various implementations;

FIG. 2 shows a method of calibrating a gyroscope based on scanning a visual code such as a Quick Response (QR) code in accordance with various implementations;

FIG. 3 shows a method of calibrating an e-compass based on scanning a visual code in accordance with various implementations;

DETAILED DESCRIPTION

Figure 4:
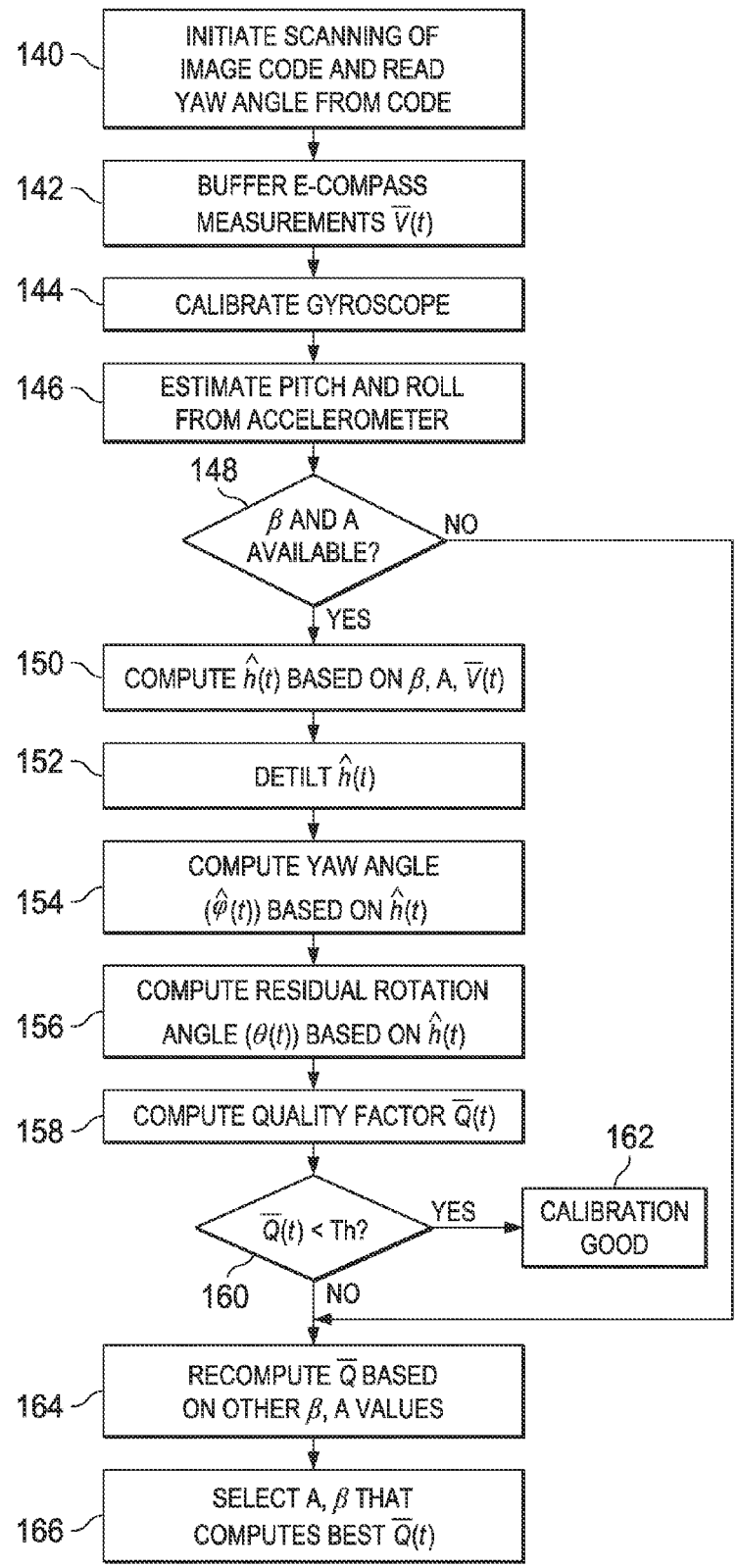
FIG. 4 shows a more specific implementation of a method of calibrating an e-compass based on scanning a visual code.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

All the existing calibration parameter estimators require that the user perform a calibration maneuver. An assisted magnetometer calibration, where the algorithm is given the magnitude of the magnetic field and the initial yaw angle is described. The embodiments provide methods which estimate the calibration parameters using this extra information, and show that it reduces dramatically the complexity of the required calibration maneuver. Since simpler calibration maneuvers are sufficient, the embodiments enable some new magnetometer calibration applications. Factory calibration may be implemented with less cost, calibration of magnetometers in vehicles (or pedestrian applications) may be done opportunistically when the initial yaw is available (from GPS for example).

The term "visual code" refers to any type of graphic depiction that encodes information such as the information described herein. An example of a visual code is a Quick Response (QR). A QR code is a specific matrix barcode (or two-dimensional code) that is readable by QR barcode readers and camera telephones. The code includes black modules arranged in a square pattern on a white background. These and other visual features enable the code to be detected by a digital camera during as scan. The information encoded may be text, a uniform resource locator (URL), or other data such as the data described below for navigation assistance. Micro codes and Microsoft tags can also be used.

If the visual code is encoded with the coordinates of the code's location, then the sensor solution can provide displacement from that point. Coordinates could be in latitude, longitude, and altitude or in any other coordinate system. Coordinates on a specific map are possible. Coordinates could contain the level or floor in the building or altitude where the QR code is located.

FIG. 1 shows an example of a system 100 which provides navigation assistance. The system 100 may include a GNSS module (e.g., GPS) 118 for which the system provides navigation assistance when, for example, the GNSS module 118 is not adequate (e.g., inside a building). The illustrative system 100 as shown includes a processor 102 coupled to a non-transitory storage device 104, an e-compass 108, a gyroscope ("gyro" for short) 110, a barometric pressure sensor 112, a digital imaging device 114, a wireless transceiver 116, an accelerometer 117, and the GNSS module 118. Other implementations of system 100 may have additional or different components to that shown in FIG. 1. In some implementations, not all of the components shown in Figure are included.

The e-compass 108 is any suitable type of magnetic field sensors. Examples include triaxis anisotropic magnetoresistive (AMR) sensors. The gyro 110 also may be a multi-axis (e.g., 3-axis) device in some embodiments. The barometric pressure sensor 112 is a sensor that generates a signal based on the sensed barometric pressure.

The digital imaging device 114 may include a charge-coupled device (CCD) to acquire digital images, and provide such images to the processor 102 for further processing in accordance with software 106. The digital imaging device 114 may be a digital camera. The digital imaging device 114 may be used to scan visual codes as explained below for navigation assistance.

The accelerometer 117 preferably is a three-axis accelerometer.

The non-transitory storage device 104 is any suitable type of volatile storage (e.g., random access memory), non-volatile storage (e.g., hard disk, solid state storage, optical storage, read-only memory, etc.), or combinations thereof. The storage device 104 contains software 106 which is executable by processor 102 to impart the system 100 with some or all of the functionality described herein.

The system 100 may be a portable device such as a smartphone or any other type of mobile device.

The quality of a navigation solution which uses sensors depends on the type of sensors used. Low cost MEMS sensors, such as those found in PND and smart-phones, may drift over-time and hence continuous re-calibration of the sensor outputs is helpful. Calibration of such sensors may be performed based on comparison of the sensor outputs with positional information derived from an external reference e.g. imaging of a visual code or detection of an external event (e.g. stationarity detection).

As explained below, the system 100 of claim 1 may be used to calibrate the gyro 110, calibrate the e-compass 108, and calibrate the barometric pressure sensor 112.

Gyro Calibration

Gyroscope calibration is optimal when the user holds the system 100 stationary for a period of time. Because the user necessarily must hold the system 100 relatively stationary to scan the visual image, in accordance with preferred embodiments, scanning and detecting a visual code triggers the processor 102 to cause the gyro to begin a calibration process. The user preferably holds the system (and the digital imaging device 114 in particular) to the visual code for some time to enable the system to read the image. When the digital imaging device 114 and processor 102 recognize the presence of a visual code, the processor 102 preferably initiates gyro calibration as there will be a short moment in which the system is stationary. As such, the recognition of the visual code triggers gyro calibration. Even if the visual code does not contain location information, at least the gyro 110 nevertheless is calibrated. Once the gyro 110 is calibrated it can reliably track relative movements of the phone for a period of time.

Calibrating the gyro 110 may include averaging the output of the gyro corresponding to each axis of the gyro during an interval when the phone is stationary (e.g., during scanning of a visual code). The computed averages represent the gyro biases. Subsequently, new gyro measurements can be calibrated by subtracting these biases from such new measurements. The biases may be dependent on the temperature of the gyro 110. A temperature sensor 111 may be provided on or near the gyro to record the gyro's temperature when requested by the processor. The processor 102 may store the biases determined at various gyro temperatures in the non-volatile storage device 104.

In some embodiments, the visual code is encoded with position and heading values that are read by the system 100 via the digital imaging device 114. The position value indicates the location of the visual code. Examples of a position value include longitude and latitude, coordinates on a map, etc. Heading values indicate the direction that the system 100 is necessarily pointing upon scanning the visual code. An example of a heading value is "due east" and the like. If the visual code encodes the heading that the system 100 is pointing in addition to the position (i.e., location) of the system, then the gyro 114 can accurately track changes in the system's position and heading for some time afterwards depending on the quality of the gyro.

FIG. 2 illustrates a method 120 pertaining to gyro calibration. The various operations may be performed or caused to be performed by the processor 102 executing software 106 in combination with the gyro 110. At 122, the method includes initiating a scan of using the digital imaging device 114. At 124, the processor 102 may detect the presence of a visual code in the digital images acquired by the digital imaging device 114. Based on detecting the presence of a visual code, the processor 102 initiates a gyro calibration process to occur (126).

E-Compass Calibration

When the user holds the smart phone camera towards the visual code, the phone will necessarily be pointing in a specific direction. If the visual code is encoded with the direction, the direction information may be used to assist with calibration of the e-compass.

By way of background, the equations that describe e-compass calibration may be as follows:

$$\begin{bmatrix} V_x(t) \\ V_y(t) \\ V_z(t) \end{bmatrix} = \begin{bmatrix} \alpha_x & s_{xy} & s_{xz} \\ s_{xy} & \alpha_y & s_{yz} \\ s_{xz} & s_{yz} & \alpha_z \end{bmatrix} \begin{bmatrix} h_x(t) \\ h_y(t) \\ h_z(t) \end{bmatrix} + \begin{bmatrix} \beta_x \\ \beta_y \\ \beta_z \end{bmatrix} + \begin{bmatrix} \varepsilon_x \\ \varepsilon_y \\ \varepsilon_z \end{bmatrix} \quad (1)$$

Using vector notation:

$$\vec{V}(t) = A \cdot \vec{h}(t) + \vec{\beta} + \vec{\varepsilon} \quad (2)$$

where $\vec{V}(t)$ is the sensor outputs at time t, A is the matrix of scale factors, $\vec{h}(t)$ is the vector of the magnetic field that is being measured at time t, $\vec{\beta}$ is the vector of biases, and $\vec{\varepsilon}$ is the vector of residual errors.

The norm of the magnetic field in a given location without magnetic interference is constant. This fact is exploited to calibrate the e-compass. In other words, it is known that for all times:

$$H^2 = h_x^2(t) + h_y^2(t) + h_z^2(t) \quad (3)$$

The e-compass calibration should solve for the 9 parameters in A and $\vec{\beta}$. In some cases it can be assumed that the off-diagonal elements of A are zero so that there are only 6 parameters to be computed.

Once calibration is complete the estimate of the magnetic field is given by:

$$\hat{h}(t) = \begin{bmatrix} \hat{h}_x(t) \\ \hat{h}_y(t) \\ \hat{h}_z(t) \end{bmatrix} = (A^T A)^{-1} (\vec{V}(t) - \vec{\beta}) \quad (4)$$

Without loss of generality (because a rotation matrix can always be applied), assume that the system 100 is oriented so that, for example, its x-axis is pointed towards the visual code, the z-axis is pointing up, and the y-axis is pointing left. While the system 100 is stationary (e.g., scanning a visual code), the processor obtains accelerometer readings from the accelerometer 117 to determine two of the three orientation angles (e.g., pitch and roll). The third angle (yaw) is known because the camera is facing the visual code being scanned. In addition, the digital imaging device 114 may measure the orientation of the visual code relative to the imaging device 114 to more accurately estimate these angles. Once pitch, roll, and yaw are known, a rotation matrix preferably is applied such that the system 100 has an assumed orientation, in this case the yaw angle φ(t) and the residual rotation angle θ(t) should have known values:

$$\hat{\varphi}(t) = \arctan\left(\frac{\hat{h}_y(t)}{\hat{h}_x(t)}\right) = \varphi \quad (5)$$

$$\theta(t) = \arctan\left(\frac{\sqrt{\hat{h}_x^2(t) + \hat{h}_y^2(t)}}{\hat{h}_z(t)}\right) = 0 \quad (6)$$

where these angles are defined as spherical coordinates, and where the yaw angle φ is the angle in the horizontal plane between the x-axis and magnetic North. There are two possible ways to use these angles, as will be explained below in greater detail:

1. Use |θ(t)| and |φ(t)−φ| to determine the quality of the e-compass calibration.
2. Perform a grid search to find the calibration parameters that minimize |θ(t)| and |θ(t)−φ| to thereby to correct the calibration of the e-compass. A global search can be performed for the calibration parameters in some embodiments, but in other embodiments, the search is performed around the calibration parameters already computed using a technique such as the one above.

The image code may also be encoded with the true magnetic field measurements at its location. In other words, the image code can provide the true value of $\vec{h} = \vec{h}(t)$ when the system 100 is at a certain orientation relative to the image code. This provides three additional equations that can be used during the calibration by equating $\hat{h}(t)$ and $\vec{h}$ for the time t when the phone was held in front of the image code.

Generally, e-compass calibration requires that the system 100 be rotated in all directions in order to solve the system of equations given above. Knowing $\vec{h} = \vec{h}(t)$ at a given point can help relax this requirement, but measurements from multiple orientations are still required. After holding the system 100 up to the image code for scanning purposes, the user will typically bring it back down—this motion rotates the system 100. During this rotation the e-compass 108 may collect data for calibration. Recognizing an image code therefore preferably triggers an e-compass calibration. To further improve the calibration, the recognition of the image code preferably triggers the system to inform the user to perform a calibration maneuver such as spinning the system.

Furthermore, after reading the image code and calibrating the gyro 110, the gyro can provide accurate estimates of the rotations of the phone for some time. This means at a given instant the tilt, pitch and roll angles are known by integrating the angular rate measurements from the gyro and adding them to the initial angles from when the system 100 was in front of the image code. This effectively provides the true values of φ(t) and θ(t) at different times, which makes the e-compass calibration easier. The yaw, pitch, and roll can be defined respectively as:

$$\tan(\varphi(t)) = \frac{h_y(t)}{h_x(t)}, \quad (7)$$

$$\tan(\phi(t)) = \frac{h_z(t)}{h_z(t)}, \quad (8)$$

$$\tan(\gamma(t)) = \frac{h_x(t)}{h_z(t)}. \quad (9)$$

Assuming that while the digital imaging device 114 is held in front of the image code at time zero, the angles are φ(0)=φ, ϕ(0)=0, and γ(0)=0. Then the estimated angles at a future time t are:

$$\varphi(t) = \int_0^t \dot{\varphi}(\lambda)\delta\lambda,\ \phi(t) = \int_0^t \dot{\phi}(\lambda)\delta\lambda,\ \text{and}\ \gamma(t) = \int_0^t \dot{\gamma}(\lambda)\delta\lambda,$$

where the angular rates come from the calibrated gyro 110. Knowing the values of these angles provides further constraints for the system of equations used for e-compass calibration. One way to use these constraints is to do a grid search for e-compass and/or gyro calibration parameters to minimize the difference between the yaw, pitch and roll angles estimated based on the gyro 110 and the e-compass 108 during the same time interval.

FIG. 3 shows a method 130 of calibrating the e-compass 108 in accordance with some implementations. The various operations may be performed or caused to be performed by the processor 102 executing software 106 in combination with the e-compass 108, gyro 110, and accelerometer 117. The operations may be performed in the order shown, or in a different order. Further, two or more of the operations may be performed in parallel rather than sequentially.

At 132, the method includes initiating a scan of a visual code by a user of the system 100 (and thereby detecting the presence of the visual code itself). While scanning the code, the system 100 also reads a yaw angle from the visual code. The yaw angle read from the visual code indicates the angle of yaw of the system 100 assuming the system is facing the visual code, which would be the case during the visual code scan operation.

At 134, the method includes the processor 102 computing an estimate of yaw angle based on magnetic field measurements, scale factors, and biases from the e-compass 108. At 136, the method includes computing a quality factor based on the yaw angle read from the visual code and the computed estimate of the yaw angle. The two yaw angles ought to be identical or relatively close to the same if the e-compass is properly calibrated. At 138, the processor 102 determines whether the calibration of the e-compass 108 is acceptable based on the computed quality factor.

The visual code may also encode the magnetic declination (i.e., the angle between magnetic north and true north). The e-compass 108 calibration may also include adjusting the determination of magnetic north by the magnetic declination encoded in the visual code. For example, the magnetic declination may be added to, or subtracted from, the determination of magnetic north FIG. 4 shows a more specific implementation of method 130 of FIG. 3. The various operations may be performed or caused to be performed by the processor 102 executing software 106 in combination with the e-compass 108, gyro 110, and accelerometer 117. The operations may be performed in the order shown, or in a different order. Further, two or more of the operations may be performed in parallel rather than sequentially.

At 140, the method includes initiating a scan of a visual code by a user of the system 100 (and thereby detecting the presence of the visual code itself). At that time, the system 100 also reads a yaw angle from the visual code. The yaw angle read from the visual code indicates the angle of yaw of the system 100 assuming the system is facing the visual code, which would be the case during the visual code scan operation.

At 142, the processor 102 obtains measurements from the e-compass 108 and buffers those measurements in, for example, the non-volatile storage device 104. The buffered e-compass measurements are $\vec{V}(t)$ as described above. The scanning of the visual code also causes the processor to calibrate the gyro 110 (144). Because the system 100 presumably is held stationary to image the visual code, visual code scanning is an excellent time to calibrate the gyro 110. Gyro calibration reduces or eliminates offset in the readings from the gyro. Gyro calibration averages out the gyro biases.

At 146, pitch and roll are estimated based on readings from the accelerometer 117. The processor 102 computes the average of the values from each axis of the multi-axis (preferably three-axis) accelerometer 117. The average is computed of samples from a window in time when the system 100 is approximately stationary, such as during visual code scanning. The average, for example, of the accelerometer's x-axis readings is computed as:

$$\bar{a}_x = \frac{1}{N}\sum_i a_x(i) \quad (10)$$

where i is the i-th sample in time, and N is the number of samples in the average. Similar computations are made for the y and z axes of the accelerometer as well. This creates the vector $\bar{a}=\lfloor\bar{a}_x\ \bar{a}_y\ \bar{a}_z\rfloor$. The processor then computes a unit vector:

$$\tilde{a} = \frac{\bar{a}}{\|\bar{a}\|}. \quad (11)$$

The processor 102 computes pitch as $p=-\sin^{-1}(\tilde{a}_x)$ and roll as r=a tan $2(\tilde{a}_y,\tilde{a}_z)$. Roll and pitch matrices are then determined to be:

$$R = \begin{bmatrix} 1 & 0 & 0 \\ 0 & \cos(r) & \sin(r) \\ 0 & -\sin(r) & \cos(r) \end{bmatrix}. \quad (12)$$

$$P = \begin{bmatrix} \cos(p) & 0 & -\sin(p) \\ 0 & 1 & 0 \\ \sin(p) & 0 & \cos(p) \end{bmatrix}. \quad (13)$$

At 148 in FIG. 4, if A and $\vec{\beta}$ are available from a prior e-compass calibration, then at 150, the processor computes $\hat{h}(t)$ based on $\vec{\beta}$, A and $\vec{V}(t)$. The computation of $\hat{h}(t)$ may be made using equation (4) above.

Detilting is performed in operation 152. Detilting maps the orientation of the system 100 from its current orientation during visual image scanning to a predetermined orientation. A technique for performing detilting includes computing $\bar{h}(t)=P^T R^T \hat{h}(t)$, where the R and P matrices are provided above at (12) and (13), respectively. The values $\bar{h}(t)$ represents the detilted estimate of the magnetic field.

At 154, the processor computes an estimate of the yaw angle ($\hat{\varphi}(t)$) based on $\bar{h}(t)$. Specifically, $\hat{\varphi}(t)$ may be computed as:

$$\hat{\varphi}(t) = \arctan\left(\frac{\tilde{h}_y(t)}{\tilde{h}_x(t)}\right) \quad (14)$$

At this point, an estimate of the yaw angle of the system 100 has been computed based on equation (14) and a yaw angle has been read from the visual code. If the e-compass 108 is in proper calibration, the two yaw angles should be approximately identical.

At 156, a residual rotation angle (θ(t)) is computed based on $\tilde{h}(t)$. The residual rotation angle θ(t) may be computed as:

$$\theta(t) = \arctan\left(\frac{\sqrt{\tilde{h}_x^2(t) + \tilde{h}_y^2(t)}}{\tilde{h}_z(t)}\right) \quad (15)$$

For an e-compass in proper calibration, the residual rotation angle θ(t) should be approximately 0.

In accordance with the various embodiments, a quality factor is computed by the processor (operation 158). In some embodiments, the quality factor (Q(t)) is computed as Q(t)=|$\hat{\varphi}$(t)−φ|, while in other embodiments, the quality factor is computed as Q(t)=$\sqrt{|\hat{\varphi}(t)-\varphi|^2+(t)}$. The former quality factor is the absolute value of the difference between the computed estimate of the yaw angle and the yaw angle read from the visual code. The latter quality factor is the square root of the sum of the square of two values. The first value is the square of the absolute value of the difference between the computed estimate of the yaw angle and the yaw angle read from the visual code. The second value is the square of the residual rotation angle θ(t).

For either quality factor, the quality factor should be approximately zero for an e-compass that is in proper calibration. At 160, the processor 102 compares the quality factor to a predetermined (preferably low) threshold to determine if the quality factor is below the threshold, thereby indicating proper calibration (162).

If the quality factor θ(t) is above the threshold (indicating improper e-compass calibration), then operations 164 and 166 may be performed to correct the calibration of the e-compass. Operations 164 and 166 are also performed if neither A nor $\vec{\beta}$ were available as determined at operation 148. At 164, the processor re-computes the quality factor using other values of A and $\vec{\beta}$, and at 166, the values of A and $\vec{\beta}$ that resulted in the best (e.g., lowest) quality factor are chosen for use by the e-compass from that point on. In some implementations and as explained above, a global search can be performed for new values of A and $\vec{\beta}$ to use but performing a search around the values of A and $\vec{\beta}$ already computed by thee-compass is more efficient.

Barometer Calibration

Figure 5:
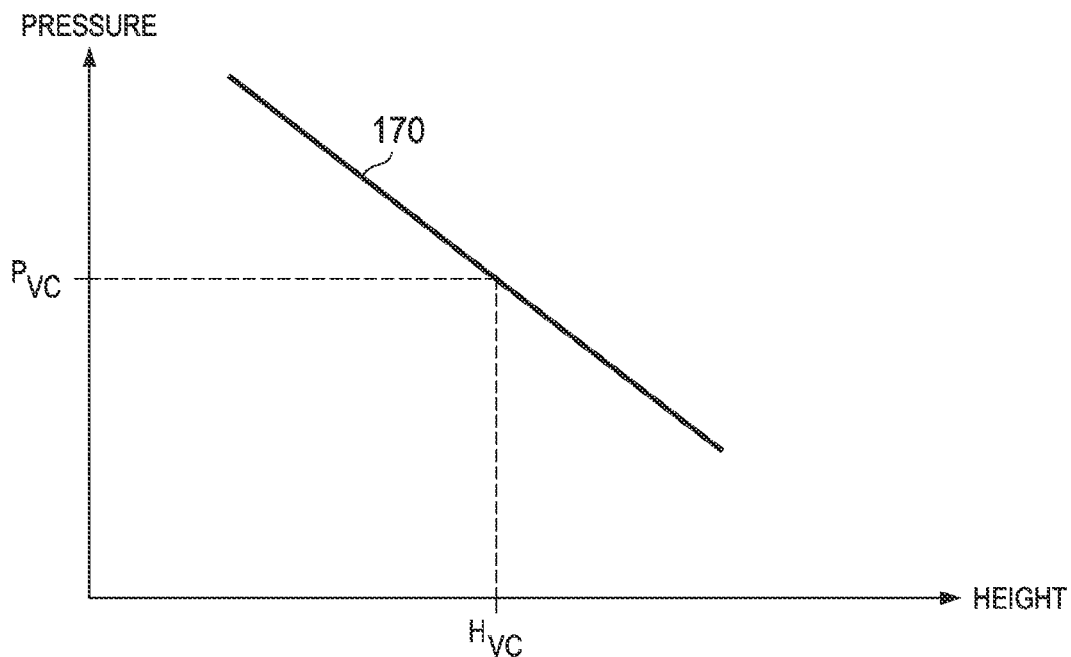
FIG. 5 illustrates the relationship between barometric pressure and height.

The system 100 of FIG. 1 also can be used to calibrate a barometric pressure sensor 112 if the system includes such a sensor. Barometric pressure sensors can be used to determine altitude or the floor of a building at which the system containing the sensor is located. FIG. 5 illustrates the relationship 170 between barometric pressure and height—lower pressure at higher elevations (floors) and higher pressure at lower elevations (floors).

In some embodiments, a visual code is encoded with an altitude or floor number at which the code is located. For example, if the visual code is located at height $H_{VC}$ (the subscript VC indicating the height of the visual code), the height $H_{VC}$ of the visual code is encoded into the visual code. The system 100 uses the digital imaging device 114 to scan the code and read the height $H_{VC}$. During the scanning operation, the processor 102 also may acquire a barometric pressure reading from the system's barometric pressure sensor 112 ($P_{VC}$).

The system 100 (e.g., the software 106) may be programmed with a mathematical relationship between pressure and height such as the following:

$$H_{NEW} = H_{VC} - \left(\frac{P_{NEW} - P_{VC}}{\Delta P/\text{FLOOR}}\right) \quad (16)$$

where $H_{NEW}$ is the system's new height to be determined, $P_{NEW}$ is the barometric pressure reading taken from the system's barometric pressure sensor 112 at the new height, and ΔP/FLOOR indicates the change in pressure for each floor of a building. For this computation, it may be assumed that each floor of a building is approximately the same height (e.g., 10 feet per floor). The new height presumable is different than the height HVC of the visual code but it could be the same. The change in pressure per floor of a building may be encoded into the visual code itself and read by the digital imaging device 114 of the system 100 or may be pre-programmed into the system. Further, the relationship between pressure and floors of a building may instead indicate the relationship between pressure altitude measured in, for example, feet above/below sea level.

Referring to equation (16), the values of $H_{VC}$, $P_{VC}$, and ΔP/FLOOR are known. To determine the floor number (or altitude) of the system, the processor causes the barometric pressure sensor 112 to report a barometric pressure reading which the processor 102 inserts into equation (16) as $P_{NEW}$ to compute $H_{NEW}$ (the system's current floor/altitude).

Figure 6:
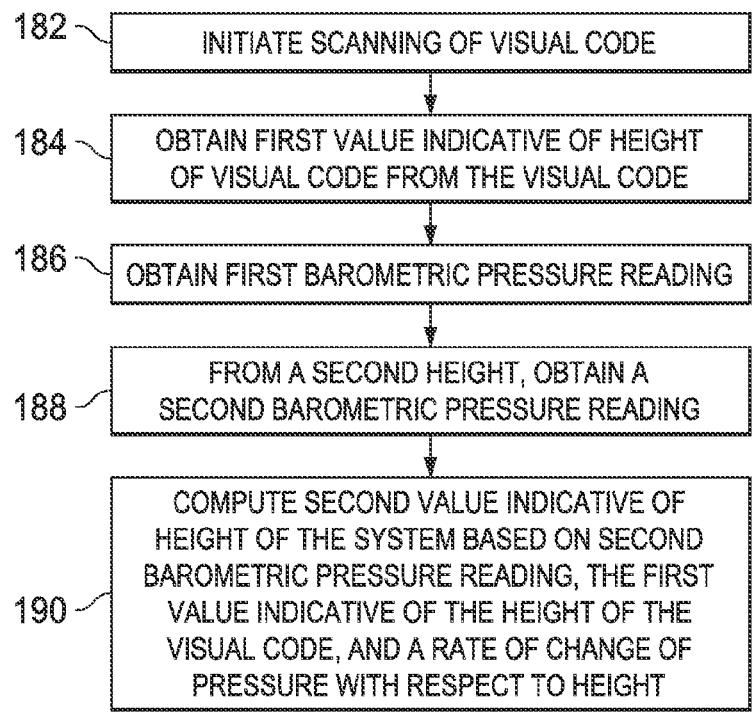
FIG. 6 shows a method of calibrating a barometric pressure sensor based on scanning a visual code in accordance with various implementations.

FIG. 6 shows a method of calibrating the barometric pressure sensor 112. The various operations may be performed or caused to be performed by the processor 102 executing software 106 in combination with the barometric pressure sensor 112. The operations may be performed in the order shown, or in a different order. Further, two or more of the operations may be performed in parallel rather than sequentially.

At 182, the method includes initiating a scan of a visual code by a user of the system 100. At 184, the method includes obtaining a first value indicative of the height (e.g., floor number, altitude, etc.) of the visual code from the visual code.

At 186, the method further includes obtaining a first barometric pressure reading from the barometric pressure sensor 112 while scanning the visual code. Thus, scanning the visual code causes the processor to obtain a pressure reading. At that point, the system has values of the height of the visual code and the barometric pressure at that height, which the system can use in equation (16) as explained above.

At 188, the system has been moved to a different height. For example, the user of the system may have moved to a different floor in a building. The method includes the processor obtaining a second barometric pressure reading at the new height. The values are all used in equation (16) and the system computes (at 190) a second value indicative of height based on the second barometric pressure reading, the first value indicative of the height of the visual code, and the rate of change of pressure with respect to height (e.g., floor).

Magnetometer Sensor

The main value of the magnetometer sensor is to determine the relative orientation of the sensors to the local frame of reference. Following is the framework and background for how this is achieved. The local frame of reference is defined as having the x and y axes lie on the horizontal plane with the x axis pointing East, the y axis pointing North, and the z-axis pointing up. This is commonly referred to as the ENU coordinate system. The Earth's magnetic field vector lies in the magnetic frame which is a not aligned with either the sensor frame or local frame of reference.

Throughput the application, the vector subscripts identify the frame of reference within which the vector is defined. L=Local frame (ENU), M=magnetic frame, and S=sensor frame.

A. Converting from Local Frame to Sensor Frame $\Phi_L^S$ is the matrix that can translate measurements in the local frame into the sensor frame of reference as a product of 3 matrices which each represent an angular rotation around one of the axes:

$$\Phi_L^S(r,p,y)=R(r)P(p)Y(y), \tag{17}$$

where R(r) is the roll matrix, P(p) is the pitch matrix, and Y(y) is the yaw matrix as defined below. The angle around the x-axis r, the angle around the y-axis p, and the angle around the z-axis y (y standing for yaw):

$$R(r) = \begin{pmatrix} 1 & 0 & 0 \\ 0 & \cos(r) & -\sin(r) \\ 0 & \sin(r) & \cos(r) \end{pmatrix} \tag{18}$$

$$P(p) = \begin{pmatrix} \cos(p) & 0 & -\sin(p) \\ 0 & 1 & 0 \\ \sin(p) & 0 & \cos(p) \end{pmatrix} \tag{19}$$

$$Y(y) = \begin{pmatrix} \cos(y) & -\sin(y) & 0 \\ \sin(y) & \cos(y) & 0 \\ 0 & 0 & 1 \end{pmatrix}. \tag{20}$$

Therefore, any unit vector in the sensor frame can be translated into the local frame via the angular rotation described by the 3 angles r, p, and y. Note that $Y(y_1)Y(y_2)=Y(y_1+y^2)$ and that $(Y(y))^T=(Y(y))^{-1}=Y(-y)$, likewise for R and P.

B. Converting from Magnetic Frame to Local Frame

Earth's magnetic field vector points towards Magnetic North (the y-axis in the magnetic frame), and the y-axis in the local frame points towards True North. Only two angular rotations are needed to describe the relative orientation of these two frames: the inclination and declination angles. Matrix $\Phi_M^L$ may translate measurements in the Magnetic frame into the local frame as a product of 2 matrices:

$$\Phi_M^L(d,i)=Y(d)R(i) \tag{21}$$

where i=inclination angle, and d=declination angle. The inclination and declination angles may be computed from a course approximation of the latitude and longitude of the device. Note that the inclination angle may be impacted by magnetic disturbance.

C. Gyro and Delta Roll/Pitch/Yaw Angles

One type of sensor commonly included in devices is a triaxis gyroscope (or gyro). It measures the angular rate around each of the axes in the sensor frame. The 3 outputs may be labeled as $\dot{r}$=angular rate around the x axis, $\dot{p}$=angular rate around the y axis, and $\dot{y}$=angular rate around the z axis. The delta change in the angles from a given point in time is simply the integration of the angular rate over the time interval.

The gyro measurements are denoted (in the sensor frame) as $g_S=(g_x\ g_y\ g_z)^T$.

In the following, gyro measurements are used to help estimate the instantaneous roll and pitch angles.

D. Accelerometer and Roll/Pitch Angles

The triaxis accelerometer may be used to estimate the pitch and roll angles that are used in $\Phi_L^S$. When the device is stationary, the accelerometers measure the gravity vector which is aligned with the z axis of the local frame. The acceleration measurement in the sensor frame is described by the following equation:

$$a_S = \Phi_L^S(r,p,y)\begin{pmatrix} 0 \\ 0 \\ g \end{pmatrix} = \begin{pmatrix} a_x \\ a_y \\ a_z \end{pmatrix}, \tag{22}$$

where g is the acceleration of gravity. Expanding this equation it is first observe that the yaw angle has no impact on the accelerometer measurements. Next, it is easily shown that given $a_S$ the pitch angle is estimated as:

$$\hat{p}=-\sin^{-1}(a_x)/g \tag{23}$$

and the roll angle is estimated as:

$$\hat{r}=\tan^{-1}(a_y/a_z). \tag{24}$$

E. Blending Accelerometer and Gyro Measurements to Estimate Roll/Pitch Angles

The gyro angular rate measurements may be blended with the angle estimates obtained from the accelerometer measurements as in (23) and (24) to obtain a more accurate estimate of the angles. IIR filters may be used for this purpose:

$$\bar{p}_t=\bar{p}_{t-1}+\Delta t(g_y(t)-\beta_y))\alpha+(1-\alpha)\hat{p}_t \tag{25}$$

$$\bar{r}_t=\bar{r}_{t-1}+\Delta t(g_x(t)-\beta_x))\alpha+(1-\alpha)\hat{r}_t \tag{26}$$

where $\alpha$ is the filter coefficient and is between 0 and 1, $\Delta t$ is the interval between gyro samples (assumed to be the same as the accelerometer samples), $g_y(t)$ and $g_x(t)$ are the t-th gyro samples, $\beta_y$ and $\beta_x$ are the gyro biases. Also, the filter is initialized according to $\bar{p}_0=\hat{p}_0$ and $\bar{r}_0=\hat{r}_0$. To mitigate the impact of integrating any residual gyro bias, the data used for calibration is best if it begins just before the rotation (calibration maneuver) starts.

F. Magnetometer and Yaw Angle

Earth's magnetic field is represented by a vector in its own frame of reference as $h_M=(0\ E\ 0)^T$, where E is its magnitude. The magnetometer is not situated in the sensor frame of reference, so the magnetic field measured by an ideal magnetometer in the absence of soft and hard iron effects is expressed as:

$$h_S=\Phi_M^S h_M=\Phi_L^S \Phi_M^L h_M=\Phi_L^S h_L. \tag{27}$$

Actual magnetometer measurements come in the sensor frame of reference and contain hard and soft iron effects as well as other non-idealities. They can be modeled as:

$$m_S=Ah_S+b_S+\epsilon \tag{28}$$

where $A=SMA_{si}$, $b_S=SMb_{hi}+b_o$, and $\epsilon$ is Gaussian wideband noise. The 3×3 diagonal matrix S contains scale factor errors, the 3×3 matrix M contains misalignment errors in the magnetometer, the 3×3 matrix $A_{si}$ represents soft iron effects, the 3×1 vector $b_{hi}$ models the hard-iron effects, and the 3×1 vector $b_o$ models the offset introduced by the magnetometer itself.

As the magnetometer is rotated the aggregate of the measurements it provides lie on the surface of an ellipsoid. Most calibration algorithms fit the parameters of an ellipsoid to the magnetometer measurements to obtain estimates of A and $b_S$ denoted as $\hat{A}$ and $\hat{b}_S$, respectively. The calibrated magnetometer measurements are then obtained as:

$$\tilde{m}_S = \hat{A}^{-1}(m_S - \hat{b}_S), \quad (29)$$

If both estimates are correct the calibrated magnetometer measurements may be expressed as (leaving out $\epsilon$):

$$\tilde{m}_S = R(r)P(p)Y(y)Y(d)R(i)\begin{pmatrix} 0 \\ E \\ 0 \end{pmatrix}$$
$$= R(r)P(p)Y(y+d)\begin{pmatrix} 0 \\ E_H \\ E_V \end{pmatrix}. \quad (30)$$

The end goal is to compute the yaw angle y from the magnetometer measurements given the angle estimates $\hat{r}$ and $\hat{p}$ from accelerometer measurements. The detilted and calibrated magnetometer measurements are written as:

$$\begin{pmatrix} \hat{m}_x \\ \hat{m}_y \\ \hat{m}_z \end{pmatrix} = P(-\hat{p})R(-\hat{r})\tilde{m}_S. \quad (31)$$

When $\hat{p}=p$ and $\hat{r}=r$ this reduces to:

$$\begin{pmatrix} \hat{m}_x \\ \hat{m}_y \\ \hat{m}_z \end{pmatrix} = \begin{pmatrix} E_H \cdot -\sin(y+d) \\ E_H \cdot \cos(y+d) \\ E_V \end{pmatrix}, \quad (32)$$

Therefore, the estimated yaw angle is given as:

$$\hat{Y} = \tan^{-1}(\hat{m}_y/\hat{m}_x) - d. \quad (33)$$

II. Calibration Method

Described is a calibration method that has apriori access to E, $A_{si}$, $b_{hi}$ and the y(0) in addition to i and d. If $A_{si}$ and $b_{hi}$ are unavailable, then the calibration parameters will be valid only for the environment where the calibration maneuver was performed—this is a common problem for magnetometer calibration. For factory calibrations, $A_{si}$ and $b_{hi}$ can be measured and made available. For applications with magnetometers in vehicles, the $A_{si}$ and $b_{hi}$ caused by the metal components of the car will always be present so they need not be separated from the calibration parameters of the sensors.

For the calibration method, magnetometer measurements will be taken over time. The measurement $m_S(t)$ is denoted as the magnetometer measurement at time t in the sensor frame. Likewise, y(t), r(t), and p(t) are the yaw, roll, and pitch at time t, respectively.

Given E and y(0), then estimating r(t) and p(t) by blending accelerometer and gyro measurements, and estimating y(t) using the gyro measurements allows an estimate of $h_S(t)$ to be constructed:

$$\hat{h}_S(t) = R(\hat{r}(t))P(\hat{p}(t))Y(\hat{y}(t)+d)\begin{pmatrix} 0 \\ E_H \\ E_V \end{pmatrix}. \quad (34)$$

The instantaneous yaw is estimated using the gyro measurements as:

$$\hat{y}(t) = y(0) + \Delta t \Sigma_{i=0}^{t} g_z(i). \quad (35)$$

The magnetometer measurement at time t is written as:

$$\begin{pmatrix} m_x(t) \\ m_y(t) \\ m_z(t) \end{pmatrix} = \begin{pmatrix} a_{1,1} & a_{1,2} & a_{1,3} \\ a_{2,1} & a_{2,2} & a_{2,3} \\ a_{3,1} & a_{3,2} & a_{3,3} \end{pmatrix}\begin{pmatrix} h_x(t) \\ h_y(t) \\ h_z(t) \end{pmatrix} + b_S + \varepsilon(t), \quad (36)$$

where $m_S(t) = (m_x(t)\ m_y(t)\ m_z(t))^T$, $a_{j,k}$ is the element at the j-th row and k-th column of A, and $h_S(t) = (h_x(t)\ h_y(t)\ h_z(t))^T$.

Next, N measurements are aggregated over time and formulate a set of linear equations to solve for the unknown A and $b_S$:

$$\begin{pmatrix} m_x(0) \\ m_y(0) \\ m_z(0) \\ \vdots \\ m_x(N) \\ m_y(N) \\ m_z(N) \end{pmatrix} = \begin{pmatrix} \hat{h}_S(0)^T & 0 & 0 & I_1 \\ 0 & \hat{h}_S(0)^T & 0 & I_2 \\ 0 & 0 & \hat{h}_S(0)^T & I_3 \\ & \vdots & & \\ \hat{h}_S(N)^T & 0 & 0 & I_1 \\ 0 & \hat{h}_S(N)^T & 0 & I_2 \\ 0 & 0 & \hat{h}_S(N)^T & I_3 \end{pmatrix}\begin{pmatrix} a_{1,1} \\ a_{1,2} \\ a_{1,3} \\ a_{2,1} \\ a_{2,2} \\ a_{2,3} \\ a_{3,1} \\ a_{3,2} \\ a_{3,3} \\ b_S \end{pmatrix} \quad (37)$$

where $0=(0\ 0\ 0)$, $I_1=(1\ 0\ 0)$, $I_2=(0\ 1\ 0)$, $I_3=(0\ 0\ 1)$, and where $\epsilon(t)=0$. This equation in a more concise form is:

$$z = Hx \quad (38)$$

where H has 3N rows. As long as H is well-conditioned one may compute the least squares solution for x:

$$\hat{x} = (H^T H)^{-1} H^T z. \quad (39)$$

Then estimates for A and $b_S$ are extracted from $\hat{x}$.

Alternatively, it can assume that the off-diagonal elements of A are zero to get a simplified equation:

$$\begin{pmatrix} m_x(0) \\ m_y(0) \\ m_z(0) \\ \vdots \\ m_x(N) \\ m_y(N) \\ m_z(N) \end{pmatrix} = \begin{pmatrix} \hat{h}_x(0) & 0 & 0 & 1 & 0 & 0 \\ 0 & \hat{h}_y(0) & 0 & 0 & 1 & 0 \\ 0 & 0 & \hat{h}_z(0) & 0 & 0 & 1 \\ & & \vdots & & & \\ \hat{h}_x(N) & 0 & 0 & 1 & 0 & 0 \\ 0 & \hat{h}_y(N) & 0 & 0 & 1 & 0 \\ 0 & 0 & \hat{h}_z(N) & 0 & 0 & 1 \end{pmatrix}\begin{pmatrix} a_{1,1} \\ a_{2,2} \\ a_{3,3} \\ b_S \end{pmatrix} \quad (40)$$

This equation in a more concise form is:

$$z = \tilde{H}\tilde{x} \quad (41)$$

Since H and $\tilde{H}$ are functions of the relative orientation of the sensor and magnetometer frames the more rotations included within the time interval $t \in [0,N]$ the more accurate the estimation of x. On the other hand, an object is to perform calibration with minimal rotations included within the time interval. In the following it is shown how much change in y, p, and/or r is required to obtain accurate calibrations.

When, the calibration parameter estimates $\hat{A}$ and $\hat{b}_S$ are extracted from $\hat{x}$. These estimates also contain soft and hard iron effects that apply only to the environment in which the calibration was performed. When the magnetometer moves into a different environment it may be better to use calibration parameters that are not dependent on any soft or hard iron effects. In the factory calibration if $A_{si}$ and $b_{hi}$ are known then the matrix SM and vector $b_o$ can be computed from $\hat{A}$ and $\hat{b}_S$.

III. Simulation Results

Solutions evaluated based on (38) and (41), and compare to the usage of a traditional methods. The ideal conditions examined below means that $\hat{y}(0)=y(0)$, $\hat{r}(t)=r(t)$, $\hat{p}(t)=p(t)$, and $a_{j,k}=0$ when $j \neq k$ in addition the given values of E, i, and d are correct. In the non-ideal conditions a Gaussian error with standard deviation of 1° is added to $\hat{y}(0)$, $\hat{r}(t)$, and $\hat{p}(t)$, a constant error of 0.01 is added to E, and $a_{j,k}$ are zero-mean Gaussian random variables with standard deviation of 0.006 when $j \neq k$. For all experiments there are N=100 magnetometer samples taken within the calibration maneuver. It is also assumed that the gyros have been perfectly calibrated. In all simulations, the magnetic field intensity, E, is taken as 0.4 gausses (G) and s is taken as a zero-mean Gaussian random variable with standard deviation of 0.005.

A new performance metric is provided for the magnetometer calibration. The impact of the error in the calibration parameter estimates actually depends on the angles r, p, and y. Therefore, this metric is the worst case error in y over all possible values of r, p, and y. This metric is computed across many random trials and look at the $95^{th}$ quantile for different amounts of rotation during calibration.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A system, comprising:
   an imaging device;
   a magnetometer sensor;
   a processor coupled to the imaging device and the magnetometer sensor,
   wherein the processor,
      causes the imaging device to scan a visual code and, based on scanning the visual code, the processor obtains a value indicative of a yaw angle of the system from the visual code and a value indicative of height of the visual code from the visual code,
      computes an estimate of a yaw angle of the system using a magnetometer measurement from the magnetometer sensor, accelerometer, and gyro measurements,
      compares the yaw angle read from the visual code to the computed estimate of the yaw angle to determine a quality factor, and
      recalibrates the magnetometer sensor when the quality factor indicates improper magnetometer sensor calibration.

2. The system of claim 1 wherein the value indicative of height of the visual code indicates a floor of a building.

3. The system of claim 1 wherein the value indicative of height of the visual code indicates an altitude.

4. The system of claim 1 wherein, the visual code includes a Quick Response (QR) code which is a matrix barcode.

5. The system of claim 1 wherein the quality factor is approximately zero for a magnetometer sensor that is in proper calibration.

6. The system of claim 1 wherein the quality factor is the absolute value of the difference between the computed estimate of the yaw angle and the yaw angle read from the visual code.

7. The system of claim 1 wherein the quality factor is the square root of the sum of the square of the computed estimate of the yaw angle and the yaw angle read from the visual code.

8. The system of claim 1 wherein a quality factor determination above a threshold value indicates an improper magnetometer sensor calibration.

9. The system of claim 1 wherein the magnetometer sensor is an e-compass.

10. A method, comprising:
    scanning a visual code;
    obtaining a value indicative of height of the visual code from the visual code;
    obtaining a value indicative of a yaw angle of an apparatus scanning the visual code from the visual code;
    computing an estimate of a yaw angle of the apparatus using a magnetometer measurement from a magnetometer sensor, accelerometer and gyro measurements;
    comparing the yaw angle read from the visual code to the computed estimate of the yaw angle to determine a quality factor, and
    recalibrating the magnetometer sensor when the quality factor indicates improper magnetometer sensor calibration.

11. The method of claim 10 wherein the magnetometer is calibrated by finding biases and scale factors that result in best quality factor.

12. The method of claim 10 wherein scanning of the visual code comprises acquiring a digital image of the visual code.

13. The method of claim 10 wherein the quality factor is approximately zero for a magnetometer sensor that is in proper calibration.

14. The method of claim 10 wherein the quality factor is the absolute value of the difference between the computed estimate of the yaw angle and the yaw angle read from the visual code.

15. The method of claim 10 wherein the quality factor is the square root of the sum of the square of the computed estimate of the yaw angle and the yaw angle read from the visual code.

16. The method of claim 10 wherein a quality factor determination above a threshold value indicates an improper magnetometer sensor calibration.

17. The method of claim 10 wherein the magnetometer sensor is an e-compass.

18. A method, comprising:
    scanning a visual code;
    obtaining a value indicative of height of the visual code from the visual code;
    obtaining a value indicative of a yaw angle scanning the visual code from the visual code;
    obtaining a magnetometer measurement from a magnetometer sensor associated with the apparatus;

computing a quality factor based on the yaw angle read from the visual code and a yaw angle computed from the magnetometer measurement; and recalibrating the magnetometer sensor when the quality factor indicates improper magnetometer sensor calibration.

19. The method of claim 18 wherein the value indicative of height is indicative of at least one of a floor number in a building and an altitude.

20. The method of claim 18 wherein scanning of the visual code comprises acquiring a digital image of the visual code.

21. The method of claim 18 wherein the quality factor is approximately zero for a magnetometer sensor that is in proper calibration.

22. The method of claim 18 wherein the quality factor is the absolute value of the difference between the computed estimate of the yaw angle and the yaw angle read from the visual code.

23. The method of claim 18 wherein the quality factor is the square root of the sum of the square of the computed estimate of the yaw angle and the yaw angle read from the visual code.

24. The method of claim 18 wherein a quality factor determination above a threshold value indicates an improper magnetometer sensor calibration.

25. The method of claim 18 wherein the magnetometer sensor is an e-compass.

26. A system, comprising:
an imaging device;
a magnetometer sensor; and
a processor coupled to the imaging device and the magnetometer sensor,
wherein the processor,
causes the imaging device to scan a visual code and, based on scanning the visual code, the processor obtains a value indicative of a yaw angle of the system and a value indicative height of the visual code from the visual code,
computes an estimate of a yaw angle of the system using a magnetometer measurement from the magnetometer sensor,
compares the yaw angle read from the visual code to the computed estimate of the yaw angle to determine a quality factor, and
recomputes the quality factor when the quality factor indicates improper magnetometer sensor calibration.

27. The system of claim 26 wherein the recomputed quality factor is used in recalibrating the magnetometer sensor.

28. The system of claim 26 wherein, the visual code includes a Quick Response (QR) code which is a matrix barcode.

29. The system of claim 26 wherein the quality factor is approximately zero for a magnetometer sensor that is in proper calibration.

30. The system of claim 26 wherein the quality factor is the absolute value of the difference between the computed estimate of the yaw angle and the yaw angle read from the visual code.

31. The system of claim 26 wherein the quality factor is the square root of the sum of the square of the computed estimate of the yaw angle and the yaw angle read from the visual code.

32. The system of claim 26 wherein a quality factor determination above a threshold value indicates an improper magnetometer sensor calibration.

33. The system of claim 26 wherein the magnetometer sensor is an e-compass.

34. The system of claim 27 wherein the Quality factor is recomputed based on other biases and scale factors and the yaw of the system is determined based on the same biases and scale factors.

35. A system, comprising:
an imaging device;
a magnetometer sensor; and
a processor coupled to the imaging device and the magnetometer sensor,
wherein the processor,
causes the imaging device to scan a visual code and, based on scanning the visual code, the processor obtains a value indicative of yaw angle and a value indicative of height from the visual code,
computes an estimate of a yaw angle of the system using a magnetometer measurement from the magnetometer sensor,
compares the yaw angle read from the visual code to the computed estimate of the yaw angle to determine a quality factor,
recomputing the quality factor when the quality factor indicates improper magnetometer sensor calibration, and
recalibrating the magnetometer sensor in response to the recomputed quality factor.

36. The system of claim 35 further including determining coordinates of the system that are at least one of latitude, longitude, altitude or floor number.

37. A method, comprising:
scanning a visual code;
obtaining a value indicative of a yaw angle from the visual code;
obtaining a value indicative of height from the visual code;
obtaining a magnetometer measurement from a magnetometer sensor associated with the apparatus;
computing a quality factor based on the yaw angle read from the visual code and a yaw angle computed from the magnetometer measurement;
recomputing the quality factor when the quality factor indicates improper magnetometer sensor calibration, and
recalibrating the magnetometer sensor when the recomputed quality factor indicates improper magnetometer sensor calibration.

38. The method of claim 37 further including determining coordinates of the system that are at least one of latitude, longitude, altitude or floor number.

* * * * *